United States Patent
Huang

(10) Patent No.: US 11,728,906 B1
(45) Date of Patent: Aug. 15, 2023

(54) CONSTANT BEAM WIDTH ACOUSTIC TRANSDUCER DESIGN METHOD

(71) Applicant: The United States of America as represented by the Secretary of the Navy, Newport, RI (US)

(72) Inventor: Dehua Huang, Newport, RI (US)

(*) Notice: Subject to any disclaimer, the term of this patent is extended or adjusted under 35 U.S.C. 154(b) by 0 days.

(21) Appl. No.: 17/724,552

(22) Filed: Apr. 20, 2022

(51) Int. Cl.
  *H04B 11/00* (2006.01)
  *H04R 3/00* (2006.01)
  *H04R 1/40* (2006.01)
  *G01V 1/18* (2006.01)

(52) U.S. Cl.
  CPC ............. *H04B 11/00* (2013.01); *H04R 1/406* (2013.01); *H04R 3/005* (2013.01); *G01V 1/187* (2013.01)

(58) Field of Classification Search
  CPC ........ H04B 11/00; H04R 1/406; H04R 3/005; G01V 1/187
  See application file for complete search history.

(56) References Cited

U.S. PATENT DOCUMENTS

| | | | | |
|---|---|---|---|---|
| 4,328,569 | A * | 5/1982 | Trott | G10K 11/26 367/905 |
| 9,838,802 | B1 * | 12/2017 | Howarth | H04R 23/002 |
| 11,107,455 | B1 * | 8/2021 | Huang | G10K 11/348 |
| 2011/0222372 | A1 * | 9/2011 | O'Donovan | G01S 3/8083 367/103 |

FOREIGN PATENT DOCUMENTS

FR  3096550 A1 * 11/2020 ............. H04R 1/403

OTHER PUBLICATIONS

Dehua Huang, The Design of Broadband Constant Beamwidth and Constant Beam Pattern Transducer, Abstract, Apr. 17, 2018, pp. 1-3, vol. 143, issue 3, Https://doi.org/10.1121/1.5036194, Journal of the Acoustical Society, USA.
Peter H. Rogers, and A.L. Van Buren, New Approach to a Constant Beamwidth Transducer, Journal, Jul. 1978, pp. 38-43, vol. 64, No. 1, Journal of the Acoustical Society, USA.
A.L.Van Buren, L. Dwight Luker, M.D. Jevnager and A.C. Tims, Experimental Constant Beamwidth Transducer, Jounrnal, Jun. 1983, pp. 2200-2209, vol. 73, No. 6, Journal of the Acoustical Society, USA.

* cited by examiner

*Primary Examiner* — Daniel Pihulic
(74) *Attorney, Agent, or Firm* — James M. Kasischke; Michael P. Stanley; Jeffry C. Severson

(57) ABSTRACT

A method for providing a broadband constant beam width acoustic array includes providing a transducer array in an axisymmetric configuration. A beam width is specified, and an integer order Legendre polynomial is determined for that beam width. A control parameter is determined that will increase the integer order Legendre polynomial to that beam width. The Legendre polynomial is used to provide a shading function for the array of transducers that will give the specified beam width.

6 Claims, 3 Drawing Sheets

US 11,728,906 B1

CONSTANT BEAM WIDTH ACOUSTIC TRANSDUCER DESIGN METHOD

STATEMENT OF GOVERNMENT INTEREST

The invention may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a method for designing a transducer having a constant beam width.

(2) Description of the Prior Art

Constant beam width transducers have been studied and tested, where the beam width is maintained as constant over a broad range of frequencies. Beam width is measured in half-angle degrees at the half power point of the beam. The half power point is the point where the beam power of the main lobe of the acoustic beam is down by $-3$ dB.

FIG. 1 shows a generic spherical transducer array. A user can control transmission and reception parameters such as power and direction at terminal 10. A processor 12 calculates shading weights in accordance with the user parameters and the known transducer array 14. Transducer array 14 is made from a plurality of transducers 16, each oriented towards a specific angle. Transducers 16 can either be hydrophones or acoustic projectors. Preferably transducers 16 are positioned in a regular three dimensional spherical array in order to simplify computation of the shading weights. Processor 12 can divide shading weights among several transducers 16 in order to create the beam pattern. Array 14 is joined to a bank of amplifiers 18. For maximum versatility, each amplifier 20 in the bank of amplifiers 18 is joined to one transducer 16; however, amplifiers 20 can also be joined to groups of transducers such as those at a specific bearing from a given bearing. Processor 12 is joined to the bank of amplifiers 18 to provide shading weights to the amplifier associated with each transducer 16. These shading weights become translated into voltage gains or attenuations by the bank of amplifiers 18. A signal source or receiver 22 is further joined to the bank of amplifiers 18. The signal source or receiver 22 is joined to each amplifier 20 without a time delay. Each amplifier 20 amplifies or attenuates the signal passing through in accordance with the calculated shading weight. This will result in the transducer array having a beam pattern with regions of increased and reduced sensitivity or amplitude.

Broadband shading functions are designed by using a velocity distribution, $u(\theta)$, over the surface of a spherical array that takes the form of a Legendre polynomial, $P_n(x)$, of degree n. This gives:

$$u(\theta) = \sum_{n=0}^{\infty} A_n P_n(\cos(\theta)) \quad (1)$$

$A_n$ are the coefficients of the Legendre polynomials. These coefficients are defined by:

$$A_n = \frac{(2n+1)}{2} \int_0^\pi u(\theta) P_n(\cos(\theta))\sin(\theta)d\theta \quad (2)$$

A spherical Hankel function $h_n$ and its derivative $h_n'$ can be utilized to relate the velocity distribution to the acoustic pressure $p(R, \theta, t)$ at time t and distance R from the array as follows:

$$p(R, \theta, t) = i\rho c U_0 e^{-i\omega t} \sum_{n=0}^{\infty} A_n P_n(\cos(\theta)) \frac{h_n(kR)}{h_n'(ka)} \quad (3)$$

where $\rho$ is the density of the medium, c is the sound speed in the medium, $U_0$ is the peak velocity, ω is the angular frequency, k is the wavenumber ω/c, and a is the radius of the spherical array. As the distance R from the array approaches infinity, a far field pressure, $p_{FF}$, can be calculated as:

$$p_{FF}(R,\theta,t)=(\rho c U_0 a e^{ik(R\to\infty)}/R)e^{-i\omega t}g(\theta) \quad (4)$$

The beam pattern, $g(\theta)$, is given by:

$$g(\theta) = \frac{e^{ika}}{ka} \sum_{n=0}^{\infty} \frac{A_n P_n(\cos\theta)}{i^n h_n'(ka)} \quad (5)$$

If the frequency ω is sufficiently high, the Hankel functions approximately equal their asymptotic form and the beam pattern $g(\theta)$ approximates the surface velocity distribution $u(\theta)$. The lowest frequency ω in which $g(\theta)$ approximates $u(\theta)$ is the cut-off frequency. An associated indicator is the wave number k multiplied by the radius a of the spherical array. The Legendre polynomial and the Hankel function order are interrelated. Higher order Legendre polynomials decrease more rapidly, and lower order Hankel functions support lower cut off frequencies.

The shading function is selected by selecting the order of the Legendre based on the desired half angle beam width. Broader beam widths are desirable for acoustic survey applications, and narrower beam widths give a more precise projection bearing. FIG. 2 shows Legendre polynomial values for half angle beam widths associated for different orders of Legendre polynomials. The Legendre polynomial values are unitless. The curve with the square symbols represents the $2^{nd}$ order Legendre polynomial, the circular symbols represents the $3^{rd}$ order Legendre polynomial, the triangular symbols represent the $4^{th}$ order Legendre polynomial, the diamonds represent the $5^{th}$ order Legendre polynomial, and the X symbols are used for the $6^{th}$ order Legendre polynomial. The maximum lobe of these functions occurs at 0 degrees. An important measurement point is where the power level of a signal associated with the function is down by one-half or 3 dB. This is shown by the line at 0.707. The zero crossing line is also important.

By convention, half angle beam width is given by the half angle where the Legendre polynomial curve crosses the half power line. As the order of the curve increases, the beam width decreases. The second order curve gives a half angle beam width of 26°. The fourth order curve has a half angle beam width of 14°, and the sixth order curve has a half angle beam width of 10°.

In order to get a shading function for a precise half angle beam width, a non-integer Legendre polynomial is calculated, generally utilizing numerical methods. Computing non-integer Legendre polynomials introduces significant complexity into array and shading function design. Furthermore, changing Legendre polynomial cannot be performed easily extemporaneously to adjust the beam width.

Thus, it is desirable to have a simpler, more flexible constant beam width array design method.

SUMMARY OF THE INVENTION

It is a first object of the present invention to provide a simpler method of providing a shading function to provide a given beam width.

Another object is to provide a method for designing a transducer array.

Accordingly, a method for providing a broadband constant beam width acoustic array includes providing a transducer array in an axisymmetric configuration. A beam width is specified, and an integer order Legendre polynomial is determined for that beam width. A control parameter is determined that will increase the integer order Legendre polynomial to that beam width. The Legendre polynomial is used to provide a shading function for the array of transducers that will give the specified beam width.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

In the prior art, the Legendre polynomial $P_v$ of order v is a function of cos θ, where θ is the conical angle between the axis of the main beam of the array and the position of interest on the spherical array. The position of interest is typically a transducer or a group of transducers. In designing, an array of transducers, it is desirable to have signal in a beam having a width defined by the conical angle from the center of the main lobe to the half power level of the main lobe. Legendre polynomials are used to give the shading function for this design because using a Legendre polynomial as the shading function gives a beam width that is constant over a broad range of frequencies. As discussed above, using a Legendre polynomial having an integer order gives a limited number of beam widths.

It has been found that a control parameter, $Z_0$, can be applied to a Legendre polynomial of a selected order v. The Legendre polynomial, $p_v(\cos θ)$, becomes $p_v(Z_0 \cos θ)$. The control parameter, $Z_0$, allows fine control of the beam width and side lobes of a Legendre polynomial of an integer order.

Figure 3:
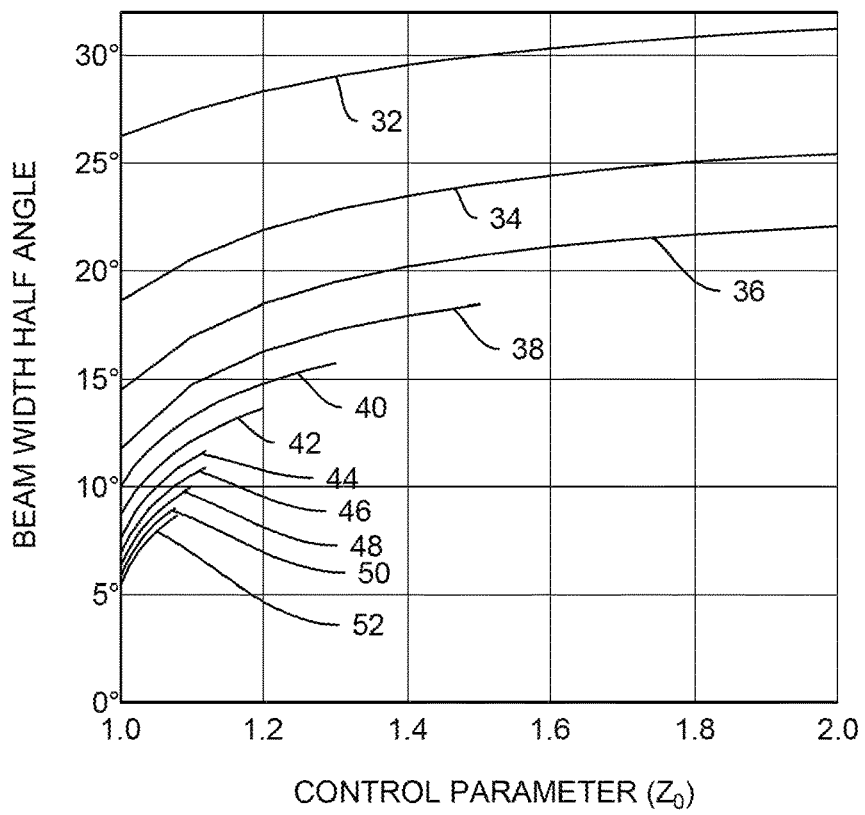
FIG. 3 is a graph showing the half angle beam width for Legendre polynomials as the control parameter varies.

FIG. 3 shows that utilizing the control parameter $Z_0$ with different orders of Legendre polynomials, one can get different beam widths. Normalized curves for the orders of Legendre polynomials are shown with by indicating the beam width half angle at the half power level with the control parameter $Z_0$. The curves are normalized by dividing the basic curve $p_v(Z_0 \cos θ)$ by $p_v(Z_0 \cos 0)$. The curve for the second order Legendre polynomial is shown at 32, the third at 34, the fourth at 36, the fifth at 38, the sixth at 40, the seventh at 42, the eighth at 44, the ninth at 46, the tenth at 48, the eleventh at 50, and the twelfth at 52. Increasing $Z_0$ value beyond a certain point has limited effect on the beam width, with the Legendre polynomial derived shadings. For this reason, $Z_0$ is most effective in a range from 1 to about 2. $Z_0$ values below 1 can be used with the effect of decreasing the main lobe of the Legendre polynomial and increasing the side lobes.

It is noted that the second order and third order do not provide overlapping beam widths. If a beam width from 26° to 31° is desired, a second order Legendre polynomial must be used. $Z_0$ can be calculated to give the beam width within this range. For a second order Legendre polynomial:

$$P_2(Z_0\cos θ_0) = \frac{1}{2}[3(Z_0\cos θ_0)^2 - 1] \quad (6)$$

This is normalized to give:

$$\frac{P_2(Z_0\cos θ_0)}{P_2(Z_0)} = \frac{[3(Z_0\cos θ_0)^2 - 1]}{[3(Z_0)^2 - 1]} \quad (7)$$

The left side of equation (7) can be set to $\sqrt{2}/2$ the half power level. One can then solve for $Z_0$ to give:

$$Z_0 = \frac{1}{\sqrt{3}}\sqrt{\frac{\sqrt{2}-1}{\sqrt{2}(\cos θ_0)^2 - 1}} \text{ and } \sqrt{2}(\cos θ_0)^2 - 1 > 0 \quad (8)$$

Here, the maximum half-angle beam width $θ_0$ is restricted by $(\cos θ_0)^2 > 1/\sqrt{2}$, or $θ_0 < 32.765°$. This process can be generalized for a normalized, order v, Legendre polynomial shading for a half angle beam width, $$\frac{P_v(Z_0\cos θ_0)}{P_v(Z_0)} = \frac{\sqrt{2}}{2} \quad (9)$$

This can be solved numerically giving the curves shown in FIG. 3.

At beam widths below about 22°, one of at least two Legendre polynomials having integer orders can be specified. Selection of the highest order of Legendre polynomial capable of being adjusted by the control parameter to give the beam width is preferred. The control parameter $Z_0$ has greater effects in suppressing side lobes when used with higher order Legendre polynomials.

Figure 4:
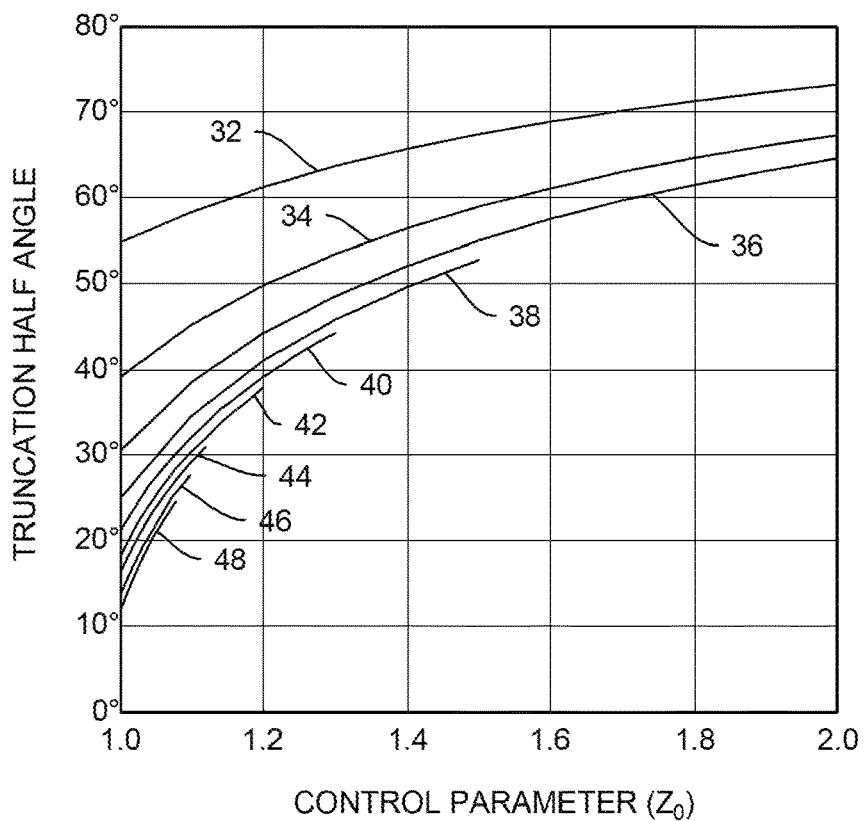
FIG. 4 is a graph showing the truncation half angle for Legendre polynomials as the control parameter varies.

The truncation half angle is the angle between the center of the main lobe and the first zero in the beam pattern adjacent to the main lobe. This can also be tailored by adjusting control parameter $Z_0$. In the array and shading function design process, the array can be truncated to a spherical cone physically or virtually by providing a zero gain at these zero locations. FIG. 4 shows the relationship between the truncation half angle and the control parameter for different orders of Legendre polynomial. The curves are numbered as in FIG. 3. The highest orders of Legendre polynomial are omitted for clarity.

Figure 1:
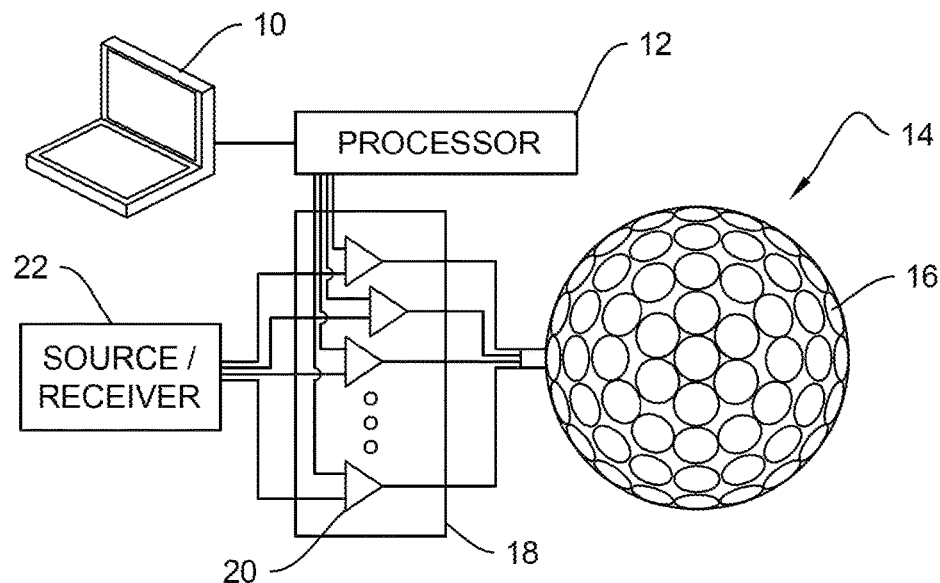
FIG. 1 is a block diagram of an apparatus for practicing the method herein.
Figure 2:
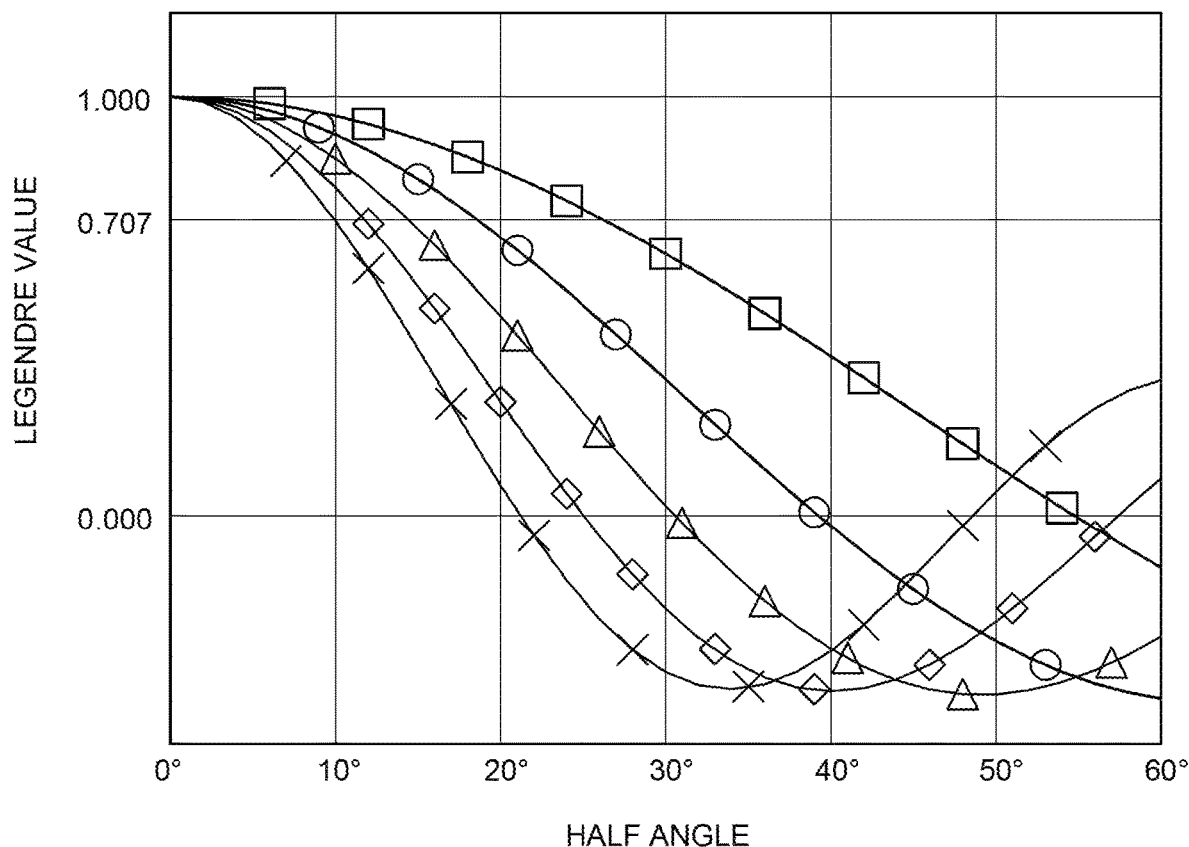
FIG. 2 is a graph of Legendre values by half angle beam widths.
Figure 5:
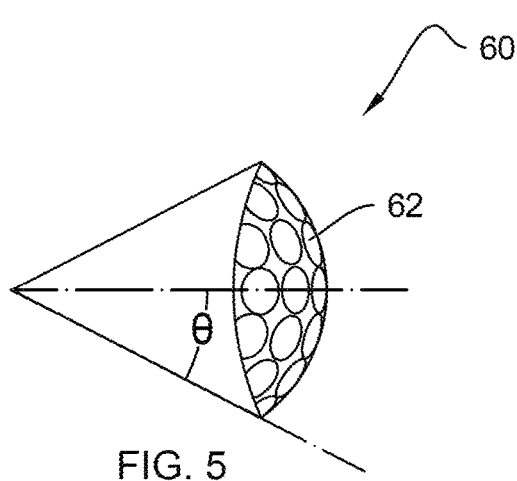
FIG. 5 is a three dimensional diagram of a first truncated transducer embodiment.
Figure 6:
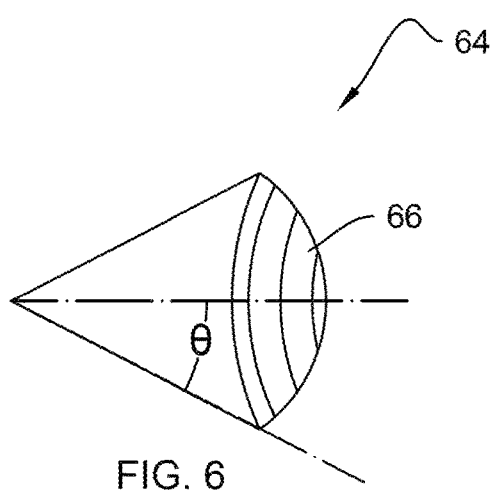
FIG. 6 is a three dimensional diagram of a second truncated transducer embodiment.

FIG. 5 shows a spherical cone array 60 made from a plurality of independent transducers 62. Array 60 is a truncated portion of array 16 given in FIG. 1. Transducers 62 extending beyond the half angle θ are truncated because they are unnecessary for propagation of the main beam lobe. FIG. 6 shows a spherical cone array 64 made from a plurality of annular transducers 66. The annular ring transducer is axisymmetric around the main lobe and ring transducer transmits at a specific annular normal angle to the surface of the sphere. Each annular ring transducer 66 is joined to an amplifier for shading.

The amplification value for the transducer associated with the particular beam angle can be calculated utilizing the Legendre polynomial of the selected order with the control parameter $Z_0$ as the shading function. This shading function is generally axisymmetric for a spherical or partially spherical transducer array. The amplification value can be calculated by integrating the magnitude of the Legendre polynomial over the surface area of the transducer at an associated angle. These amplifications can be used with either discrete transducers such as in array 60 or annular transducers such as in array 64.

Figure 7:
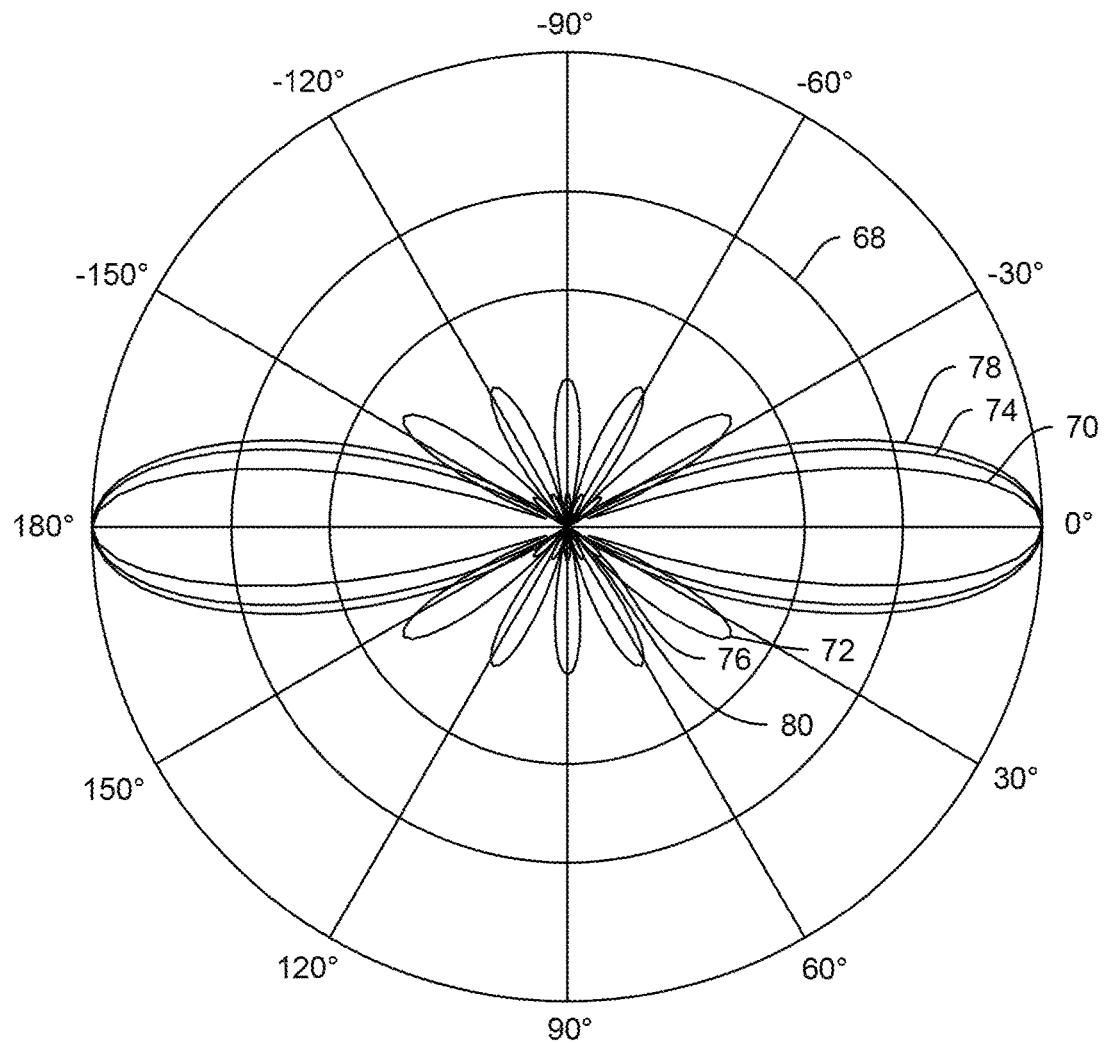
FIG. 7 is a polar graph of sixth order Legendre polynomial showing the effects of control parameter changes.

FIG. 7 is a normalized polar plot of a sixth order Legendre polynomial with different values of control parameter $Z_0$. The plot of FIG. 7 is oriented in the same direction as the arrays shown in FIG. 5 and FIG. 6. The half power line is identified at 68. The main lobe of the basic sixth order Legendre polynomial ($Z_0=1$) is identified at 70. The first side lobe is identified at 72. The main lobe of the sixth order Legendre polynomial where $Z_0=1.1$ is indicated at 74, and the first side lobe is indicated at 76. The main lobe for a control parameter $Z_0$ of 1.2 is indicated at 78. The first side lobe for this value is indicated at 80. The first null occurs at the zero function value between the main lobe and the first side lobe.

From this plot, it can be seen how increasing the control parameter $Z_0$ changes the Legendre polynomial of a given order. For example, the basic sixth order Legendre polynomial gives a half angle beam width of just under 10°. By using a control parameter, $Z_0=1.1$, this is broadened to about 13°. Increasing control parameter $Z_0$ to 1.2 gives a beam width of about 15°. Increasing control parameter $Z_0$ has the added benefit of suppressing the side lobes of the function. Note the reduction of side lobe 72 to side lobe 76 utilizing 1.1 as the control parameter $Z_0$. This acts to reduce unwanted transmissions or receptions outside of the main beam of the array. Increasing the control parameter also increases the first null angle. Because the Legendre polynomial is used in formulating the shading function and providing transducer shading values, increasing the control parameter $Z_0$ increases the beam width of the main lobe of the associated transducer array and suppresses the side lobes.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for providing a broadband constant beam width acoustic array:
   providing an array of transducers in a known three dimensional axisymmetric configuration with each transducer having an associated signal;
   receiving a user specified beam width;
   determining a Legendre polynomial integer order utilizing a Legendre polynomial having a beam width less than the user specified beam width;
   calculating a control parameter for application to a Legendre polynomial having the determined Legendre polynomial integer order that will give the user specified beam width;
   utilizing the Legendre polynomial having the determined Legendre polynomial integer order with the calculated control parameter to give a shading function for the associated signals of the array of transducers; and
   utilizing the shading function with the array of transducers for transmission, reception, or both transmission and reception of signals.

2. The method of claim 1, wherein the determined Legendre polynomial integer order has an order one less than the Legendre polynomial having a beam width greater than the user specified beam width.

3. The method of claim 1, wherein the shading function is calculated by integrating the magnitude of the Legendre polynomial having the determined Legendre polynomial integer order with the calculated control parameter over the surface area of one transducer at an associated angle.

4. The method of claim 1, wherein the shading function is calculated by normalizing the Legendre polynomial having the determined Legendre polynomial integer order with the calculated control parameter by the maximum value of the Legendre polynomial having the determined Legendre polynomial integer order with the calculated control parameter.

5. The method of claim 1, wherein utilizing the shading function is further calculated by fully attenuating all transducer associated signals having the associated angle beyond the angles of the first nulls of the Legendre polynomial having the determined integer order.

6. The method of claim 1, wherein the array of transducers has a beam pattern with a main lobe and a plurality of side lobes, and the control parameter is increased to suppress side lobes in the beam pattern.

* * * * *